May 12, 1953 R. D. SIMPSON ET AL 2,637,965
APPARATUS FOR REAPING SEED CROPS
Filed March 24, 1950 2 Sheets-Sheet 2
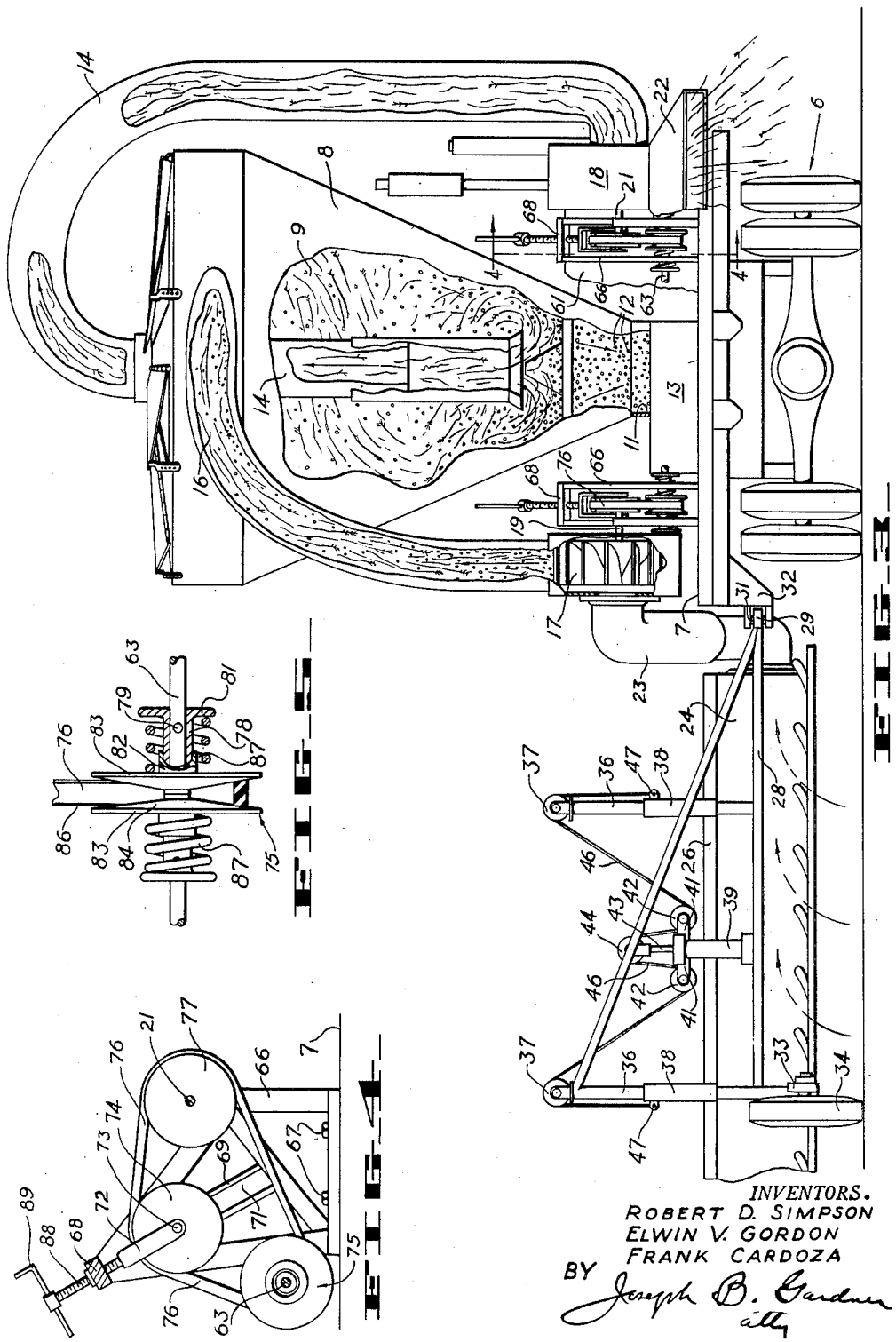
INVENTORS.
ROBERT D. SIMPSON
ELWIN V. GORDON
FRANK CARDOZA
BY Joseph B. Gardner
atty Patented May 12, 1953

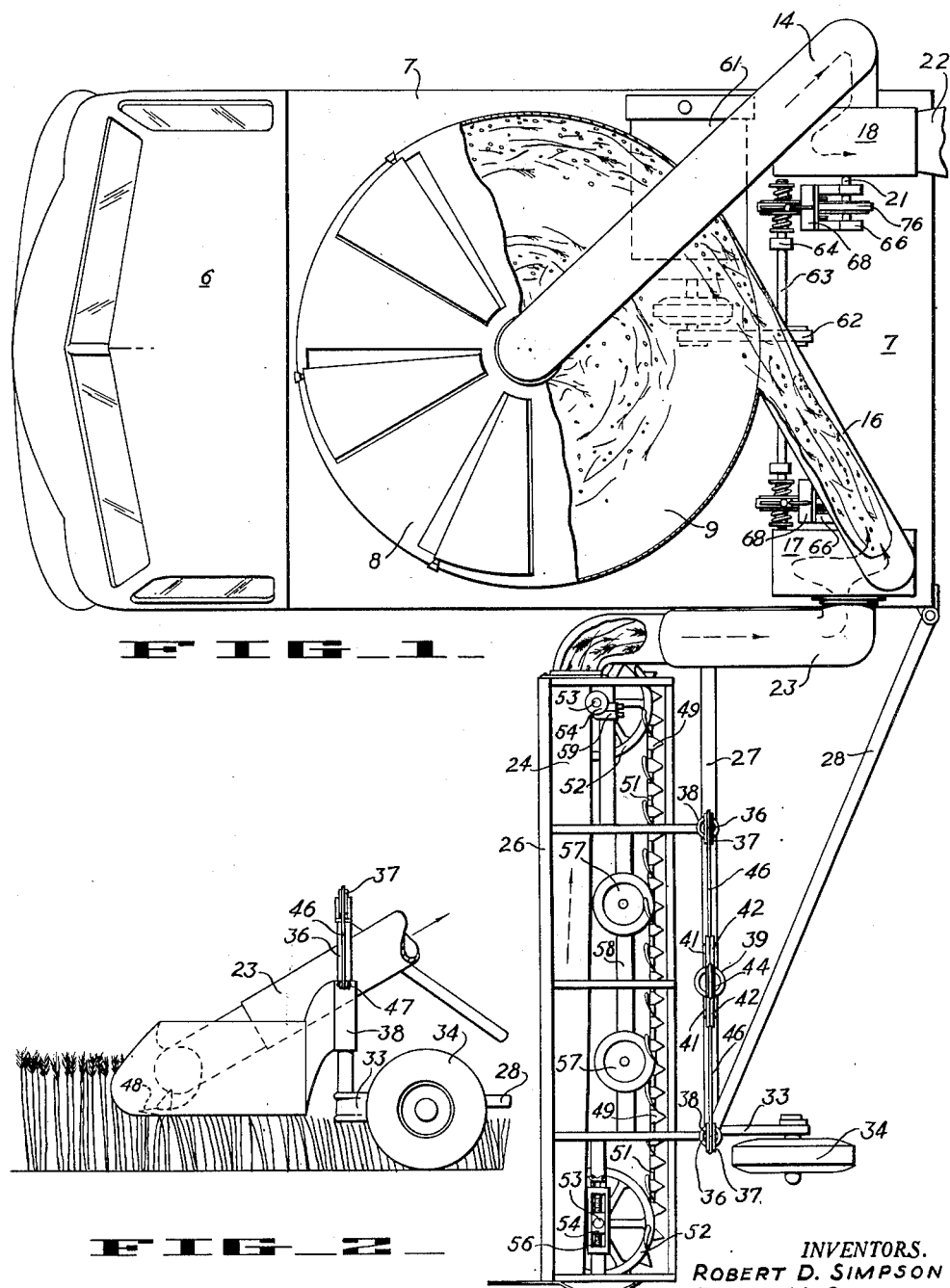

2,637,965

UNITED STATES PATENT OFFICE 2,637,965

APPARATUS FOR REAPING SEED CROPS

Robert D. Simpson and Elwin V. Gordon, San Leandro, and Frank Cardoza, Hayward, Calif., assignors to Farm Production Engineers, Inc., Hayward, Calif., a corporation of California Application March 24, 1950, Serial No. 151,718

3 Claims. (Cl. 56—20)

This invention relates to mechanisms for effecting segregation of intermixed substances of relatively different specific gravities.

An object of the invention is to provide mechanism for handling separable substances of differing unit mass weights wherein, by the sole means of a conveyor of fluid, entrained substances are transported from the initial charging point through the stages of relative separation of the various components, to the final points of disposition of the latter.

Another object of the invention is to provide mechanism of the character described wherein means are provided for selectively varying the impetus given to the carrier stream and its entrained material at different points in the flow path so as to compensate for and expedite the movement of unusually dense mixtures of material which may be introduced into the path and for affording extension or curtailment of the time that the entrained material is exposed to processing in its traversal of the path.

An additional object of the invention is to provide improved means for conveying material entrained in a carrier fluid flowing along an initial feed path branching at a junction into a plurality of distribution paths, the entrained material being arrested in its initial movement adjacent the junction by imposed forces selectively variable to effect direction of components of the conveyed material into one or another of the distribution paths.

A further object of the invention is to provide mechanism capable of handling substances such as long stalk grain wherein the stalks are urged to flow along a transport path in substantially parallel relation to the latter and with the seed-bearing heads of the stalks disposed at the trailing ends of the stalks to thus lessen the chances of intermeshing of seed heads during the course of flow which ordinarily causes wadding of the entrained material so that its passage through the machine is undesirably impeded or completely stopped.

Still another object of the invention is to provide a machine capable of effecting a much higher percentage of seed recovery, than is possible with conventional previously available apparatus, from crop stands which have reached such a degree of ripeness that seed kernels are easily dislodged from the seed-bearing heads at the slightest disturbance of the stalks and are liable to fall to the ground and become lost before the seed heads can be drawn into the harvester.

Yet another object of the invention is to provide a harvesting machine operable in a manner which insures against clogging of the machine in the event that very dense concentrations of seed bearings stalks should be encountered in the harvesting operations, the latter condition in fact improving the efficiency of the material transportation system.

It is a further object of the invention to provide mechanism for efficiently handling standing grain of much greater height than can be successfully accommodated by conventional reel-type reapers.

It is another object of the invention to provide an improved machine of the class described which is capable of handling larger unit volumes of material at much greater transportation speeds than conventional reapers which is reflected in higher ground speed of the machine and materially increased daily output.

It is still a further object of the invention to provide mechanism of the character described capable of subjecting selected components initially removed from an original mixture to a subsequent separation action so as to provide an ultimately selected product substantially completely devoid of traces of adulterant and undesirable rejected components of the mixture.

An additional important object of the invention is to provide mechanism of the character referred to which is capable of separating seeds from dew-laden grain much more efficiently than presently available apparatus for the reason that the grain, prior to the actual separation of seeds or kernels therefrom, is pre-dried to substantially remove all surface moisture which would otherwise seriously interfere with the separation efficiency of the machine.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The improved apparatus of our invention is capable of application in numerous arts wherein it is desired to effect separation from a carrier stream of fluid, of entrained components which have relatively different specific gravities further differing from the specific gravity of the carrier fluid, but we prefer to illustrate and describe our invention in connection with a machine for harvesting seed crops since due to the close approach of the seed values, in the matter of unit mass weight, to the straw waste matter, peculiarities of processing which are present are either not encountered or are not as pronounced in the processing of other substances.

Referring to the drawings:

Figure 1 is a top plan view of the harvesting machine of our invention, portions of the view being broken away so as to more clearly disclose internal features of construction.

Figure 2 is a fragmentary end elevational view showing the sickle unit associated with the structure of Figure 1.

Figure 3 is a rear elevational view of the structure shown in Figure 1, portions of the view being broken away so as to more clearly disclose internal details of construction.

Figure 4 is an enlarged scale vertical sectional view taken in the plane indicated by the line 4—4 of Figure 3 and illustrating the constructional details of one of the speed change drive units.

Figure 5 is an enlarged scale side elevational view of a portion of the structure shown in Figure 4.

The aforesaid harvester mechanism includes a suitable transport vehicle here shown as comprising a motor truck 6 preferably provided with a flat cargo bed or mobile frame 7 serving as the supporting platform for the majority of units forming the harvesting mechanism. The principal unit occupying and suitably supported on the platform 7 is an axially vertical housing 8 which encloses a downwardly converging conically shaped separator chamber 9 having a bottom discharge opening 11, through which recovered seed values 12 may be passed downwardly out of the separator chamber into a suitable collection receiver 13 or other similar device, also having a central axially extending suction duct 14, through which stalks and other waste elements may be carried from the chamber, and further being provided with charging means here shown as an inlet duct 16 entering the upper portion of the chamber, preferably in tangential relation to the periphery of the latter and through which a mixture of seed and stalk components of the crop may be introduced into the chamber. Any type of separator, including the foregoing essential constructional features, may be employed, but it is preferred, in the interests of most efficient operation, to employ a type of separator substantially as illustrated in the drawings. Such separator mechanism effects more complete and rapid separation of grain and waste elements such as stalks and the like than is possible to achieve with similar devices of ordinary construction.

Flow propagating means here shown as a pair of separate fan type blowers 17 and 18, having independent drive shafts 19 and 21 respectively, is provided on the platform 7, the separator inlet duct 16 being connected to the pressure outlet of what will hereinafter be referred to as the pressure blower or air impelling and grain threshing means 17 while an external downward extension of the separator suction or discharge duct 14 is connected to the suction inlet of what will hereinafter be referred to as the suction blower 18. The pressure outlet of the suction blower 18 is connected with suitable discharge means here illustrated as a rearwardly extending spout 22 through which stalks and other waste may be discharged rearwardly of the advancing transport vehicle 6. The suction inlet of the pressure blower 17 is here shown connected to one end of a duct 23 whose other end is attached to and opens into a horizontally elongated sheet metal suction hood 24 carried by the forward side of a sickle unit frame 26 disposed to extend laterally from the path along which the transport vehicle 6 may be moving and parallel to the ground surface. Said duct 23 and hood 24 comprise a pneumatic conduit means.

An outrigger frame is provided comprising preferably tubular arms 27 and 28 joined together at their outer ends and relatively spaced apart at their other ends and provided with suitably apertured eyes 29 engaged by pins 31 preferably removably disposed in brackets 32 carried by the vehicle platform 7 and relatively spaced along the side thereof. The outermost portion of the outrigger frame, preferably at the junction of the arms 27 and 28, carries a rearwardly extending bracket 33 on the distal end of which is journaled a ground-engaging wheel 34 serving to support the outer end of the outrigger frame. Connected with and rising from the distal end and from a medial portion, respectively, of the frame arm 27 is a support structure here shown as comprising a pair of upwardly extending guide columns 36 carrying, at their upper ends, journaled peripherally grooved pulleys 37 and further having vertically slidable sleeves 38 thereon which are attached, in any suitable manner, with the sickle unit frame 26. Carried by the arm 27, at a point intermediate the positions of the guide columns 36, is a power applicator means which may conveniently comprise an axially vertical hydraulic cylinder 39 having oppositely extending brackets 41 at the upper end thereof on which are journaled peripherally grooved pulleys 42 and having a vertically movable plunger 43 carrying a rotatable peripherally grooved pulley 44 at its upper extremity. A cable 46, trained over the pulley 44 passes downwardly and under each pulley 42, upwardly and over each pulley 37 of the guide columns 36 and is connected at its opposite ends to suitable lugs 47 carried by each of the slidable sleeves 38. Fluid under pressure delivered from a suitable source, such as a force pump driven by the vehicle motor, may be controlled in a manner familiar to those skilled in the art, to effect raising or lowering of the ram 43 relative to the cylinder 39 and thus correspondingly raise and lower the sleeves 38 on the guide columns 36 so as to vary and maintain the vertical position of the sickle unit frame 26 relative to the surface of the ground.

Attached to the lower longitudinal bar of the frame 26, on the forward side of the latter, is a cutter here shown as comprising a fixed toothed sickle bar 48 over and longitudinally of which is arranged to be passed a series of sickle teeth 49 attached to and extending horizontally from a flexible loop belt 51 tractionally engaged with peripherally grooved pulleys 52 carried by axially vertical shafts 53 journaled in suitable bearing mountings 54 provided at opposite ends of the sickle bar frame. One of the bearing mountings 54, as shown in Figure 1, is provided with suitable screw adjustment means 56 by means of which a desired degree of linear tautness may be maintained in the belt 51 and one or more idler pulleys 57 carried by frame members 58 are engaged with side reaches of the belt to lessen vertical sag of the latter in the spaces between the main pulleys 52. One of the shafts 53, preferably that situated closest to the transport vehicle 6, is connected with a suitable motor 59 here shown as being of the type capable of operation by means of compressed air, which motivating force may be supplied by a suitable compressor driven by the vehicle motor, it being unnecessary to show the said compressor or its drive since such arrangements are quite familiar to those skilled in the art. The proportions and dispositions of the parts are such that the motor 59, upon the admittance of activating compressed air thereto, will rotate the drive shaft 53 thereby causing the belt 51 to complete successive continuous circuitous movements so as to move the sickle teeth 49 at high speed laterally across the fixed sickle teeth 48 and thus effect a cutting off of any grain stalks which may be introduced into the spaces between the latter sickle teeth.

An auxiliary drive motor, which is preferably a gasoline powered unit 61 independent from the motor which propels the vehicle 6, is mounted on the platform 7 and has its output shaft connected by means of a driving belt 62, to rotate a countershaft 63 journaled in suitable bearings, 64 carried by the platform and terminating at its respective ends adjacent the relatively spaced pressure and suction blowers 17 and 18. Separate speed change units, one of which is shown in detail in Figures 4 and 5, are disposed between the countershaft 63 and the respective blower drive shafts 19 and 21 whereby the rotational speeds and consequently the flow-inducing powers of the blowers may be selectively and independently varied as desired to meet changing operational requirements of the harvesting machine. Each of the speed change units comprises a pair of relatively spaced structural or molded frames 66, suitably secured by bolts 67 or other means to the platform 7, which are tied together at their upper end portions by a laterally disposed cross-member 68 and which are each provided with a vertically inclined bar member 69 having a guide groove 71 therein confronting and paralleling an equivalent groove of the companion frame 66. Engaging the pair of grooves 71 and slidable therealong is a fork block 72 carrying a shaft 73 on which is journaled an idler pulley 74 peripherally grooved to tractionally engage a continuous flexible belt 76 which is also tractionally engaged with a corresponding pulley 77 secured to and rotatable, as the case may be, with the drive shafts 19 or 21 of the pressure or suction blowers 17 or 18. At spaced positions on the countershaft in proper alignment with the respective speed change units are variable diameter belt pulleys 75 each comprising, as shown in Figure 5, a pair of axially abutting sleeves 78 secured, by pins 79 or otherwise, to and for rotation with the countershaft and having at their relative outer ends diametrically enlarged flanges or collars 81 preferably formed integrally therewith. Slidable on the sleeves 78 are the hub members 82 of axially spaced disks 83 having relatively confronting conically-shaped faces 84 corresponding in angularity with the relatively angularly disposed side surfaces 86 of the belt 76 and capable of engagement therewith. Springs 87 which are installed under compressive stress so as to exert a constant expansive force axially, are interposed between each collar 81 and the adjacent outer face of a disk 83 to thus forcibly urge the disks of each pair thereof to approach each other and to pinch therebetween the sides of the intervening belt 76. Such pressure of the disks it will be seen will have a tendency to force the belt, if sufficient slack exists in the latter, radially outwardly of the disks so as to bear against the outermost marginal zones of the respective cone-shaped surfaces 84. The idler pulley 74 is capable of being variably positioned relative to the pulley 77 and to the variable diameter pulley 75 by means of an adjusting screw 88 threadedly engaged in the cross-member 68, having its lower end journaled in and fixed against axial movement relative to the fork block 72, and provided at its outer end with a radially extending crank 89 or other torque-applying means for effecting rotation of the screw. Normally, the fork block 72 occupies a position in a lower portion of the guide groove 71 wherein the loop of the belt 76 is extended to a maximum degree in the direction inter-axially of the shafts 63 and 21, or 19 as the case may be, so that tractional engagement of the belt is effected in the radially outermost zones of the countershaft and blower shaft. The minimum ratio here shown between the countershaft and blower shaft pulleys is substantially unity since a rotational speed of either blower not greatly in excess of that of the drive motor 61 has been found to afford adequate air pressure or suction to meet the average operating conditions. It is, however, within the scope of our invention to provide much larger variable diameter pulleys 75 than those shown so that overdriving of the blower shafts with respect to the rotational speed of the countershaft 63 may be secured if desired. In the structure shown, it will be seen that manipulation of the crank 89 to move the fork block 72 upwardly in its guide groove 71 will similarly move the idler pulley 74 so that the belt 76 is drawn into more pronounced triangular conformation. This tightens the reaches of the belt and forces the latter, as will be seen in Figure 5, to press radially inwardly between the disks 83 thus forcing the disks axially apart against the pressure of the springs 87 and establishing a reduced effective diameter of the pulley 75 in its drive relationship with the belt. Thus the speed ratio between the countershaft and the blower shafts may be selectively varied at will.

In operation, and with both blowers 17 and 18 and the sickle unit motor operating, the transport vehicle 6 is caused to advance along a stand of grain to be cut as indicated in Figure 2. Thus as the sickle cuts the grain stalks, the air being forcibly drawn into the suction hood 24 by the blower 17, and in directions substantially as indicated by the flow arrows, will pick up the cut stalks and their grain-bearing heads and will convey the latter longitudinally of and within the hood, through the duct 23 and into the suction inlet of the blower. A peculiar action occurs immediately in advance of the suction hood as the latter moves forwardly into the grain stand which has a direct bearing on the efficiency of operation of the improved harvester of the invention. As the sickle unit advances and immediately prior to and following cutting of the proximal ranks of stalks, the uppermost and usually more bulky portions of the stalks will be horizontally packed together to a considerable degree in the direction of the sickle unit advancement. This compression will render the aforesaid upper portions of the grain stand less pervious to the passage of air therethrough than normally with the result that the majority of air drawn into the suction head 24 will pass upwardly thereinto through the lower and less dense portions of the grain stand. The effect is that the air draft first acts on the lower portions of the cut stalks causing the latter to start movement along the suction hood toward the blower 17 in advance of their attached grain heads. Also due to the fact that the grain heads are slightly retarded from entering the suction head by their relative crowding as previously explained and are only dislodged by their own gravitational weight and the tugging force of the laterally moving stalks, the stalks, it will be seen, will quickly assume positions parallel to the flow of air longitudinally of the suction head and will be drawn stalk foremost into the duct 23 and blower 17. This rapid orientation of the stalks in the air stream obviously lessens the danger of wadding of entwined stalks in the suction head or in following portions of the transportation path of the cut material this being further accentuated by the fact that the grain heads trail the stalks and consequently less danger exists of relative interlocking of the grain heads than would be the case if the latter were allowed to precede their associated stalks. It will also be seen that due to the prominence of the upward draft into the suction head a much lesser percentage of grain loss will be suffered during the harvesting of slightly overripe crops for the reason that any seeds detached from the grain heads, by the shock of sickle tooth impact with the stalks or by rubbing against adjacent heads, in falling through the standing grain will be caught up by the ascending draft and drawn into the suction head.

As the cut grain, which is now entirely supported in and is being transported by the air stream, enters the blower 17, the rapidly revolving fan thereof will practically instantly disintegrate the grain heads effecting a thorough separation of the seeds therefrom whereupon the mass of seeds, stalks, and other waste elements resulting from the threshing operation, will continue to move without any hesitancy of flow at considerably high velocity through the duct 16 to thereafter be discharged tangentially into the upper diametrically enlarged portion of the separation chamber 9. Thus the mass of seeds and other elements classed as waste will be caused to whirl within the chamber under the sustaining impetus of the succeeding flow of air and entrained material entering from the duct 16 with the result that the seeds which are heavier per unit than the stalks and other waste elements will be urged by centrifugal force radially outwardly of the mass to lie against the inner wall surface of the chamber and to gradually move under the influence of gravity in a spirally descending path along the wall surface toward and to ultimately pass through the discharge aperture into the collection receiver 13. The balance of the mixture consisting of the lighter components of stalks, chaff and the like comprising the core portion of the whirling mass also gradually descends until such descent is arrested as the material is brought under the influence of the countering suction draft in the discharge tube 14 whereupon the waste materials will be continuously drawn out of the separation chamber and will be discharged through the spout 22 into the field rearwardly of the advancing harvester. Thus it will be seen that the grain bearing stalks from the moment that they are cut from the grain stand will be caught up in a current of air and while being supported solely by the said air current will be continuously transported through the successive stages of threshing, segregation of the seeds from the waste elements, and final discharge of the waste elements.

The value of the separate speed varying means for the pressure and suction blowers 17 and 18 respectively lies in the ability of the machine operator to rapidly vary the transport velocities of the air entrained material and consequently the processing characteristics to meet changing crop conditions as the latter are encountered so as to continue harvesting operations without appreciable interruption and to forestall possible undue loss of grain values which might be carried off as waste in the tailings and also to prevent collection with the seeds of undesirable amounts of stalk particles or chaff which would necessitate the subsequent time consuming operation of recleaning the recovered seeds. In many instances when proper operational balance has been achieved between the relative rotational speeds of the blowers 17 and 18 to effect satisfactory transportation of harvested material and seed recovery from the latter, field areas will be encountered in which, among other things, the standing grain may be more dense than that in areas previously traversed or dampness of the grain due to absorption of atmospheric moisture or to being in a retarded state of ripeness may upset the operational balances existing in the machine. For instance, in the case of more dense grain stands, it often is necessary to speed up the blower 17 which applies suction force to the sickle unit in order to expedite the clearance therefrom of the increased quantities of stalks and seed heads as the succeeding grain is cut and passed into the sickle unit. This may or may not entail a corresponding change in the operational speed of the blower 18 to accommodate the increased mass of material existing at any one time within the separation chamber. Likewise, dampened or slightly unripe grain may possess a different proportionate unit weight balance between the seeds and waste elements which means that the suction blower 18 must be increased in speed to prevent the core mass of waste material settling so low in the separation chamber that the discharge aperture 11 through which recovered seeds are passed will become clogged with matted stalks and chaff. On the other hand, under the conditions wherein the grain may be overly ripe, the critical weight balance between seeds and stalks may again differ with the possible result that the core of waste material will be retarded in its gravital descent in the separation chamber so that expeditious discharge of the waste through the suction discharge duct 14 will not be obtained resulting in decreased efficiency of machine operation, possible clogging of the entire separation chamber due to excessively large accumulations of waste materials, and loss of time which thereafter must be expended in clearing the clogged condition. An experienced operator, by observing the condition of the standing grain into which the machine is progressing and the respective discharges into the collection receiver 13 and out of the tailing spout 22 can quickly restore the best operating conditions by manipulations of one or both of the cranks 89 controlling the settings of the respective speed varying units of the blowers.

One of the most important attributes of the apparatus of our invention is its ability to precondition the mixture of grain and waste material so that most efficient recovery of seed values from the mixture may be realized. In many instances it is required that harvesting crews wait as late as mid morning before operations may be started. The reason for this is that a heavy morning dew may so thoroughly wet the standing grain that presently available equipment cannot efficiently handle it. In the present apparatus, the grain immediately after being cut by the reaper sickle is subjected to the drying effect of the conveyor draft of air and is under the influence of the draft while being carried to and while in the separator. Thus any undesirable mixture which may be present on the grain or waste materials will be very rapidly evaporated so that a substantially dry condition will be obtained in the mixture in the separator with the result that most efficient segregation of seed values and waste components of the mixture will ensue. It will be readily apparent that due to such pre-drying of the mixture the apparatus is capable of efficiently operating during early morning hours when other conventional harvesting equipment would be forced into inactivity, thus greatly extending the working day and profitably shortening the overall time of the harvesting period.

While the foregoing description, in order to afford a readily understood and mentally visual picture of the invention, has dealt with the operational features as related to grain or the like crops, it is within the capabilities of the present or functionally equivalent apparatus to effect relative separation of components of other flowable mixtures such as liquids or comminuted solids providing there exists a difference in unit mass weight between elements of the mixture so that natural precipitation can occur.

We claim:

1. A grain harvesting, threshing and separating device comprising a mobile frame having mounted thereon a grain cutting device, pneumatic conduit means associated with said cutting means, an air impelling and grain threshing means operatively connected to said conduit means, pneumatic separator means operatively connected to said impelling and threshing means, a grain receiver and a chaff discharge conduit operatively connected to said separator, and a pneumatic impelling means in said discharge conduit.

2. A grain harvesting, threshing and separating device comprising a mobile frame having mounted thereon a grain cutting device, pneumatic conduit means associated with said cutting means, an air impelling and grain threshing means having a suction inlet and a discharge outlet, said suction inlet being operatively connected to said conduit means, pneumatic separator means operatively connected to said discharge outlet of said impelling and threshing means, a grain receiver and a chaff discharge conduit operatively connected to said separator, and a pneumatic impelling means having a suction inlet operatively connected to said discharge conduit.

3. Apparatus as set forth in claim 2, in which said separator means includes a separation chamber having a bottom discharge opening for said grain and in which said discharge conduit is disposed in spaced relation to and above said grain discharge opening.

ROBERT D. SIMPSON.
ELWIN V. GORDON.
FRANK CARDOZA.

References Cited in the file of this patent

UNITED STATES PATENTS

| Number | Name | Date |
| --- | --- | --- |
| Re. 18,333 | Reeves | Jan. 12, 1932 |
| 1,103,324 | Sooy | July 14, 1914 |
| 1,514,915 | Laukhuff | Nov. 11, 1924 |
| 2,214,533 | La Fave | Sept. 10, 1940 |
| 2,474,557 | Templeton | June 24, 1949 |
| 2,479,764 | Morton et al. | Aug. 23, 1949 |

FOREIGN PATENTS

| Number | Country | Date |
| --- | --- | --- |
| 101,777 | Australia | Aug. 5, 1937 |